United States Patent
Nikopour et al.

(10) Patent No.: US 9,356,748 B2
(45) Date of Patent: May 31, 2016

(54) SYSTEM AND METHOD FOR SCALABLE DIGITAL COMMUNICATIONS WITH ADAPTIVE SYSTEM PARAMETERS

(71) Applicant: Huawei Technologies Co., Ltd., Shenzhen (CN)

(72) Inventors: Hosein Nikopour, San Jose, CA (US); Jianglei Ma, Ottawa (CA); Peiying Zhu, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 14/453,875

(22) Filed: Aug. 7, 2014

(65) Prior Publication Data

US 2015/0043540 A1 Feb. 12, 2015

Related U.S. Application Data

(60) Provisional application No. 61/863,213, filed on Aug. 7, 2013.

(51) Int. Cl.
*H04B 7/216* (2006.01)
*H04L 5/00* (2006.01)
*H04J 13/16* (2011.01)
*H04B 1/707* (2011.01)
*H04J 11/00* (2006.01)

(52) U.S. Cl.
CPC .............. *H04L 5/003* (2013.01); *H04B 1/707* (2013.01); *H04J 11/00* (2013.01); *H04J 13/16* (2013.01); *H04L 5/0044* (2013.01); *H04B 2201/7071* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 6,512,737 B1 | 1/2003 | Agee | |
| 8,467,347 B2 * | 6/2013 | Gao | G01S 19/30 370/330 |
| 2003/0193923 A1 * | 10/2003 | Abdelgany | H04B 1/005 370/342 |
| 2004/0202233 A1 | 10/2004 | Kim et al. | |
| 2007/0077952 A1 | 4/2007 | Sartori et al. | |
| 2010/0122143 A1 | 5/2010 | Lee et al. | |
| 2011/0085453 A1 * | 4/2011 | Wu | H04L 5/0007 370/252 |
| 2012/0213299 A1 * | 8/2012 | Cronie | H04L 1/0041 375/259 |
| 2012/0257570 A1 | 10/2012 | Jang et al. | |
| 2013/0003812 A1 | 1/2013 | Collotta et al. | |
| 2014/0140360 A1 * | 5/2014 | Nikopour | H04J 13/00 370/479 |

OTHER PUBLICATIONS

International Search Report and Written Opinion of Patent Cooperation Treaty (PCT), International Application No. PCT/US2014/050074, Applicant Huawei Technologies Co., Ltd., date of mailing Nov. 18, 2014, 10 pages.

Popovski, P., et al.,"Deliverable D2.1 Requirement Analysis and Design Approaches for 5G Air Interface," ICT-317669-METIS/D2.1, Mobile and wireless communications Enablers for the Twenty-twenty Information Society (METIS), Aug. 30, 2013, 72 pages.

Yoshida, M., et al., "Analysis of Sparsely-Spread CDMA via Statistical Mechanics," Information Theory, 2006 IEEE International Symposium, Jul. 9-14, 2006, pp. 2378-2382.

* cited by examiner

*Primary Examiner* — Bob Phunkulh
(74) *Attorney, Agent, or Firm* — Slater Matsil, LLP

(57) ABSTRACT

A method for operating an adapting device includes selecting a first access mode out of a plurality of access modes for a first transmission between a first communications device and a second communications device, wherein the selection of the first access mode is made in accordance with an access mode criterion, and at least one of communications system information, and user equipment information, and determining sparse code multiple access (SCMA) parameters from the first access mode in accordance with a SCMA parameter mapping rule. The method also includes providing information about the first access mode to at least one of the first communications device and the second communications device.

27 Claims, 11 Drawing Sheets

SYSTEM AND METHOD FOR SCALABLE DIGITAL COMMUNICATIONS WITH ADAPTIVE SYSTEM PARAMETERS

This application claims the benefit of U.S. Provisional Application No. 61/863,213, filed on Aug. 7, 2013, entitled "System and Method for Scalable Sparse Code Multiple Access with Adaptive System Parameters," which application is hereby incorporated herein by reference.

TECHNICAL FIELD

The present disclosure relates generally to digital communications, and more particularly to a system and method for scalable digital communications with adaptive system parameters.

BACKGROUND

Different radio access techniques exist for different purposes or applications. However, there is no general framework and mechanism to put them under the same umbrella and switch among them depending on the requirements of particular situations. These techniques include sparse code multiple access (SCMA), multicarrier modulations such as orthogonal frequency division multiplexing (OFDM), downlink (DL) user superposition, non-orthogonal multiple access (NOMA), code division multiple access (CDMA), uplink (UL) multi-user multiple-input multiple-output (MU-MIMO), low density signature (LDS).

SUMMARY OF THE DISCLOSURE

Example embodiments of the present disclosure which provide a system and method for scalable digital communications with adaptive system parameters.

In accordance with an example embodiment of the present disclosure, a method for operating an adapting device is provided. The method includes selecting, by the adapting device, a first access mode out of a plurality of access modes for a first transmission between a first communications device and a second communications device, wherein the selection of the first access mode is made in accordance with an access mode criterion, and at least one of communications system information, and user equipment information. The method also includes determining, by the adapting device, sparse code multiple access (SCMA) parameters from the first access mode in accordance with a SCMA parameter mapping rule, and providing, by the adapting device, information about the first access mode to at least one of the first communications device and the second communications device.

In accordance with another example embodiment of the present disclosure, a method for operating a first device is provided. The method includes sending, by the first device, user equipment information to a second device, wherein the user equipment information comprises at least one of user equipment requirements and user equipment capability, and receiving, by the first device, information about sparse code multiple access (SCMA) parameters related to an access mode for a transmission between the first device and a third device, wherein the access mode is selected out of a plurality of access modes in accordance with an access mode criterion, and at least one of the user equipment information and communications system information. The method also includes communicating, by the first device, with the third device in accordance with the access mode.

In accordance with another example embodiment of the present disclosure, an adapting device is provided. The adapting device includes a processor. The processor selects a first access mode out of a plurality of access modes for a first transmission between a first communications device and a second communications device, wherein the selection of the first access mode is made in accordance with an access mode criterion, and at least one of communications system information, and user equipment information. The processor also determines sparse code multiple access (SCMA) parameters from the first access mode in accordance with a SCMA parameter mapping rule, and provides information about the first access mode to at least one of the first communications device and the second communications device.

In accordance with another example embodiment of the present disclosure, a user equipment is provided. The user equipment includes a transmitter, a receiver, and a processor operatively coupled to the transmitter and to the receiver. The transmitter sends user equipment information to a first communications device, wherein the user equipment information comprises at least one of user equipment requirements and user equipment capability. The receiver receives information about sparse code multiple access (SCMA) parameters related to an access mode for a transmission between the user equipment and a second communications device, wherein the access mode is selected out of a plurality of access modes in accordance with an access mode criterion, and at least one of the user equipment information and communications system information. The processor communicates with the second communications device in accordance with the access mode.

One advantage of an embodiment is that access modes may be adapted to meet access mode criteria, as well as requirements and/or capabilities of the communications system and UE.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
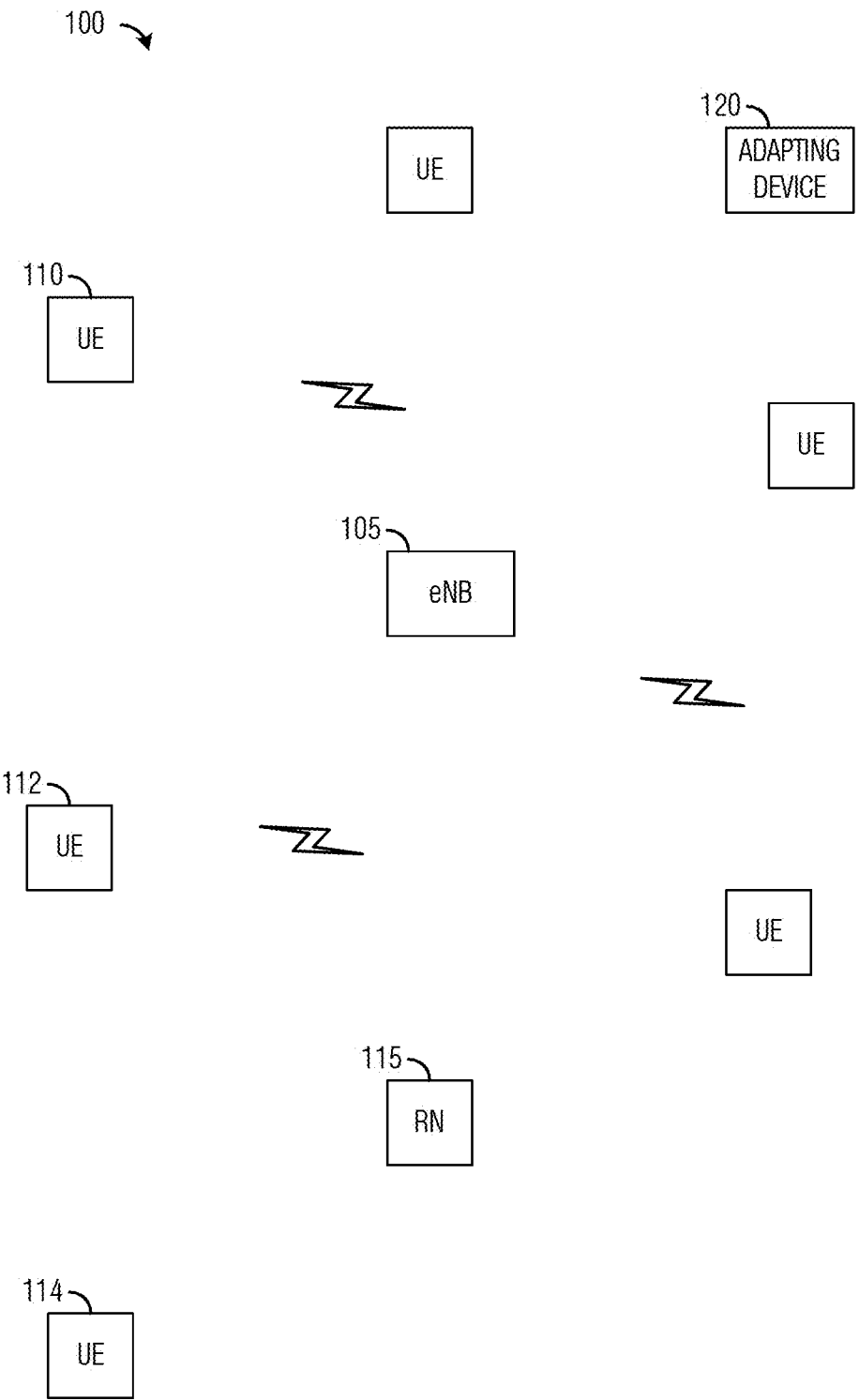
FIG. 1 illustrates an example communications system according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to scalable digital communications with adaptive system parameters. For example, an adapting device receives access mode criteria for a first communications channel between a communications controller and a user equipment, selects a first access mode in accordance with a set of mapping rules to meet the access mode criteria, and provides information about the first access mode to the communications controller and the user equipment.

The present disclosure will be described with respect to example embodiments in a specific context, namely SCMA communications systems that adaptively adjust their radio access mode for different access mode criteria. The disclosure may be applied to standards compliant communications systems, and non-standards compliant communications systems, that adaptively adjust their radio access mode for different access mode criteria.

In SCMA, data is spread over multiple time-frequency tones of OFDMA resources through multi-dimensional codewords. Sparsity of codewords helps to reduce the complexity of joint detection of multiplexed SCMA layers by using message passing algorithm (MPA). In general, each layer of SCMA has its specific codebook set. Low density spreading (LDS) is a special case of SCMA. LDS as a form of multi-carrier CDMA (MC-CDMA) is used for multiplexing different layers of data. As opposed to SCMA with multi-dimensional codewords, LDS uses repetitions of the same (QAM) symbol on layer-specific nonzero position in time or frequency. As an example, in LDS-orthogonal frequency division multiplexing (LDS-OFDM) a constellation point is repeated (with some possible phase rotations) over nonzero frequency tones of a LDS block. The shaping gain of multi-dimensional constellations is one of the advantages of SCMA over LDS. The gain is potentially high for higher order modulations where the repletion coding of LDS shows a large loss and poor performance.

SCMA is an encoding technique that encodes data streams, such as binary data streams, or in general, M-ary data streams, where M is an integer number greater than or equal to 2) into multidimensional codewords. SCMA directly encodes the data stream into multidimensional codewords and circumvents quadrature amplitude modulation (QAM) symbol mapping, which may lead to coding gain over conventional CDMA (and LDS) encoding. Notably, SCMA encoding techniques convey data streams using a multidimensional codeword rather than a QAM symbol.

Additionally, SCMA encoding provides multiple access through the use of different codebooks for different multiplexed layers, as opposed to the use of different spreading sequences for difference multiplexed layers, e.g., a LDS signatures in LDS, as is common in conventional CDMA encoding. Furthermore, SCMA encoding typically uses codebooks with sparse codewords that enable receivers to use low complexity algorithms, such as message passing algorithms (MPA), to detect respective codewords from combined codewords received by the receiver, thereby reducing processing complexity in the receivers.

FIG. 1 illustrates an example communications system 100. Communications system 100 may support SCMA communications. Communications system 100 may include an evolved NodeB (eNB) 105 operating as a communications controller. Communications system 100 may also include user equipment (UE), such as UE 110, UE 112, and UE 114. eNB 105 may include multiple transmit antennas and multiple receive antennas to facilitate MIMO operation, wherein a single eNB may simultaneously transmit multiple data streams to multiple users, a single user also with multiple receive antennas, or a combination thereof. Similarly, the UEs may include multiple transmit antennas and multiple receive antennas to support MIMO operation. In general, an eNB may also be referred to as a communications controller, a NodeB, a base station, a controller, and the like. Similarly, a UE may also be referred to as a mobile station, a mobile, a terminal, a user, a subscriber, and the like. Communications system 100 may also include a relay node (RN) 118 that is capable of utilizing a portion of resources of eNB 105 to help improve coverage and/or overall performance of communications system 100.

An adapting device 120 may adapt access modes for communications system 100 or a portion thereof. Adapting device 120 may adjust communications system parameters of communications system 100 or a portion thereof to meet access mode criteria to provide an access mode for devices in communications system 100. A detailed discussion of adapting device 120 is presented below. It is noted that although shown in FIG. 1 as being a single stand-alone device, in other example embodiments, there may be multiple adapting devices, each responsible for a different part of a communications system. Alternatively, adapting device 120 may be co-located in other devices in communications system 100. As an example, some or all of the eNBs in communications system 100 may include adapting devices.

While it is understood that communications systems may employ multiple eNBs capable of communicating with a number of devices, only one eNB, one RN, an adapting device, and a number of UEs are illustrated for simplicity.

SCMA-OFDM is a code-domain multiplexing scheme over multicarrier modulation in which the spreading codebooks are sparse and hence detection can be made simpler. Spreading factor, sparsity of codebooks, and number of the maximum SCMA multiplexed layers are communications system parameters indicating the flexibility of the SCMA waveform.

Figure 2:
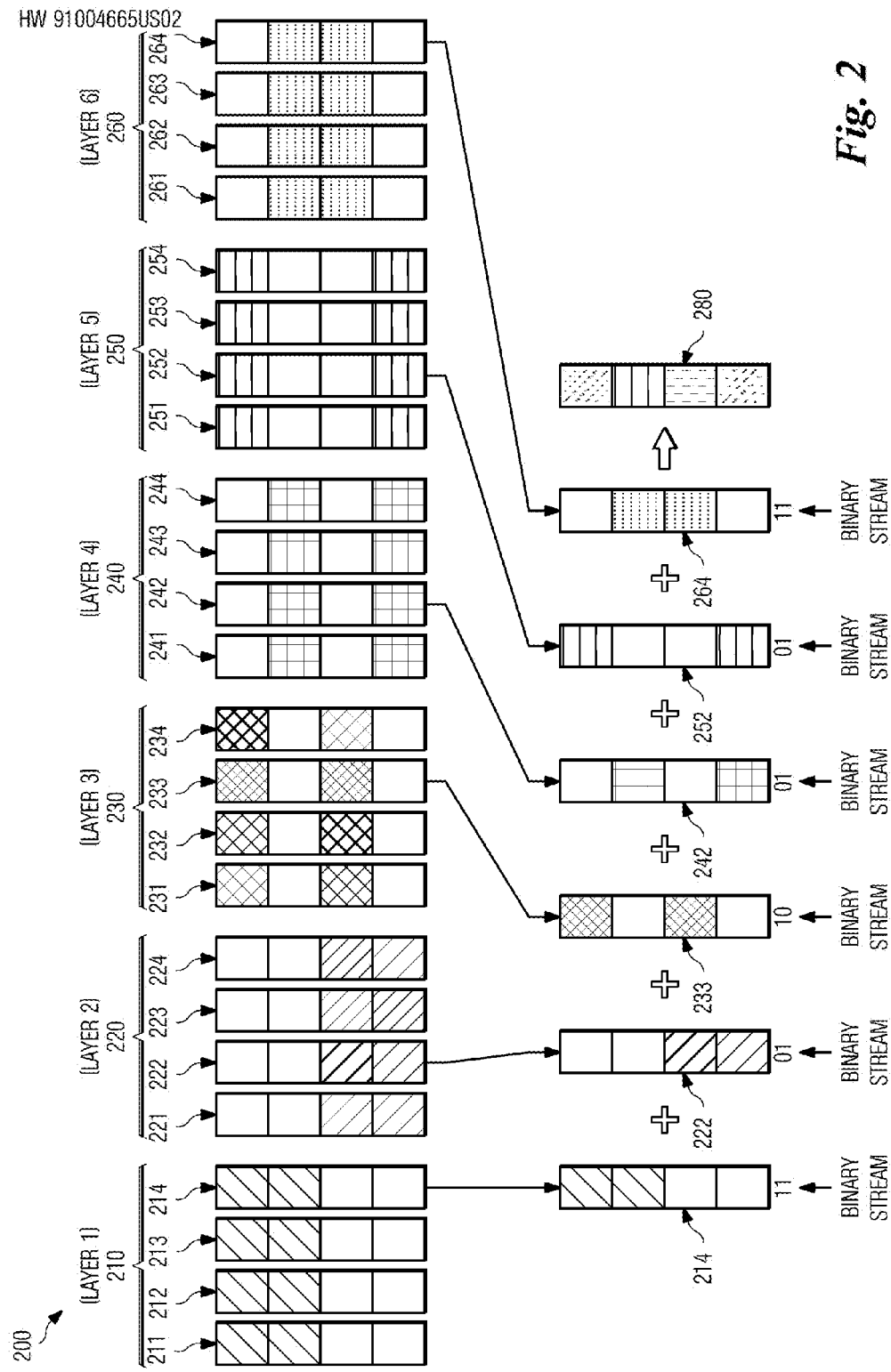
FIG. 2 illustrates an example SCMA multiplexing scheme for encoding data according to example embodiments described herein.

FIG. 2 illustrates an example SCMA multiplexing scheme 200 for encoding data. As shown in FIG. 2, SCMA multiplexing scheme 200 may utilize a plurality of codebooks, such as codebook 210, codebook 220, codebook 230, codebook 240, codebook 250, and codebook 260. Each codebook of the plurality of codebooks is assigned to a different multiplexed layer. Each codebook includes a plurality of multidimensional codewords (or spreading sequences). It is noted that in LDS, the multidimensional codewords are low density sequence signatures. More specifically, codebook 210 includes codewords 211-214, codebook 220 includes codewords 221-224, codebook 230 includes codewords 231-234, codebook 240 includes codewords 241-244, codebook 250 includes codewords 251-254, and codebook 260 includes codewords 261-264.

Each codeword of a respective codebook may be mapped to a different data, e.g., binary, value. As an illustrative example, codewords 211, 221, 231, 241, 251, and 261 are mapped to binary value '00', the codewords 212, 222, 232, 242, 252, and 262 are mapped to the binary value '01', the codewords 213, 223, 233, 243, 253, and 263 are mapped to the binary value '10', and the codewords 214, 224, 234, 244, 254, and 264 are mapped to the binary value '11'. It is noted that although the codebooks in FIG. 2 are depicted as having four codewords each, SCMA codebooks in general may have any number of codewords. As an example, SCMA codebooks may have 8 codewords (e.g., mapped to binary values '000'...'111'), 16 codewords (e.g., mapped to binary values '0000'...'1111'), or more.

As shown in FIG. 2, different codewords are selected from various codebooks 210, 220, 230, 240, 250, and 260 depending on the binary data being transmitted over the multiplexed layer. In this example, codeword 214 is selected from codebook 210 because the binary value '11' is being transmitted over the first multiplexed layer, codeword 222 is selected from codebook 220 because the binary value '01' is being transmitted over the second multiplexed layer, codeword 233 is selected from codebook 230 because the binary value '10' is being transmitted over the third multiplexed layer, codeword 242 is selected from codebook 240 because the binary value '01' is being transmitted over the fourth multiplexed layer, codeword 252 is selected from codebook 250 because the binary value '01' is being transmitted over the fifth multiplexed layer, and codeword 264 is selected from codebook 260 because the binary value '11' is being transmitted over the sixth multiplexed layer. Codewords 214, 222, 233, 242, 252, and 264 may then be multiplexed together to form multiplexed data stream 280, which is transmitted over shared resources of a network. Notably, codewords 214, 222, 233, 242, 252, and 264 are sparse codewords, and therefore can be identified upon reception of multiplexed data stream 280 using a low complexity algorithm, such as a message passing algorithm (MPA) or a turbo decoder.

According to an example embodiment, an access mode of a communications system (or of a portion of a communications system) is be specified, at least in part, by communications system parameters. The communications system parameters, when set to specific values, may determine how the communications system communicates with UE within it. As an illustrative example, access modes in a SCMA communications system may be specified by a number of communications systems parameters, including:

M—a number of codewords in a SCMA codebook.
K—a spreading factor.
J—a maximum number of layers (or codebooks and/or signatures). It is noted that the number of signatures may exceed this value if signature reuse is allowed, such as in an uplink.
N—a number of nonzero elements of each codeword.
$d_f$—a maximum number of codewords colliding at a tone.
λ—an overloading factor.
l—a number of overlapping elements of any two distinct codebooks Example values of the communications system parameters include:

$$J = \binom{K}{N}.$$

$$d_f = \binom{K-1}{N-1} = \frac{JN}{K},$$

which determines the complexity of the MPA algorithm $\propto M^{d_f}$.

$$\lambda = \frac{J}{K} = \frac{d_f}{N}.$$

$$\max(0, 2N - K) \le l \le N - 1.$$

An example SCMA communications system design example is as follows:

$$N = 2 \ J = \binom{K}{N} = \binom{K}{2} = \frac{K(K-1)}{2};$$

if $K = 4$, then $J = 6$.

$$d_f = \binom{K-1}{N-1} = \binom{K-1}{1} = K - 1, \forall j;$$

if $K = 4$, then $d_f = 3$.

$$\lambda = \frac{J}{K} = \frac{K-1}{2};$$

if $K = 4$, then $\lambda = 4$.

$0 \le l \le 1$ if K=4, which means that the codewords are either totally orthogonal with no overlap (l=0) or they collide only over one non-zero element (l=1). Then, a factor graph of an SCMA codebook may be of the form:

$$\begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix}.$$

According to an example embodiment, the communications systems parameters of a communications system may be set so that the access mode of the communications system emulates that of another communications system. As an illustrative example, a SCMA communications system may be set to emulate an orthogonal frequency division multiple access (OFDMA) communications system if communications system parameters K is set to 1 (K=1) and N is set to 1 (N=1). As another illustrative example, a SCMA communications system may be set to emulate a CDMA communications system if communications system parameters N and K are set to be equal (N=K) and non-zero elements are not allowed in the codebooks. The codebooks may be constructed over quadrature amplitude modulation (QAM) symbols with CDMA spreading signatures.

Figure 3A:
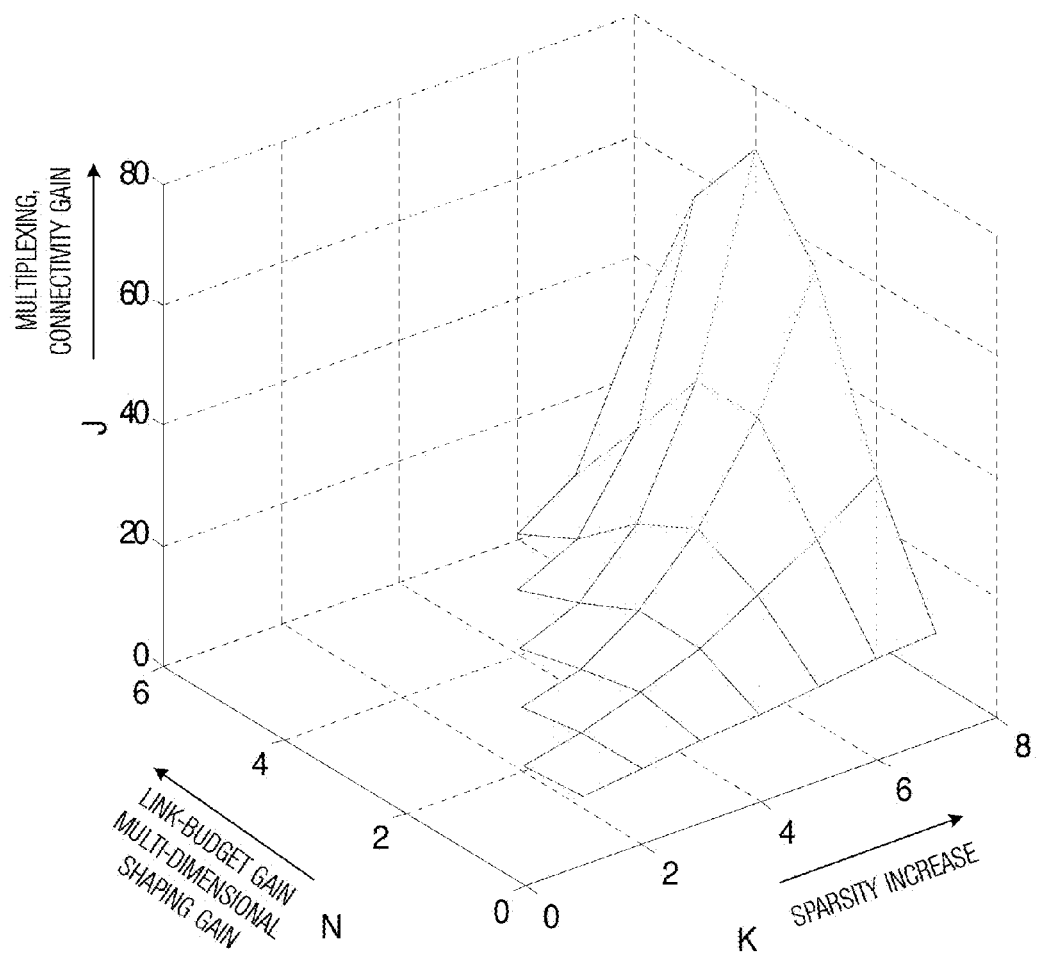
FIGS. 3a and 3b illustrate example plots of SCMA system parameters highlighting complexity, multiplexing, spectral efficiency, and link-budget trade-off according to example embodiments described herein.
Figure 3B:
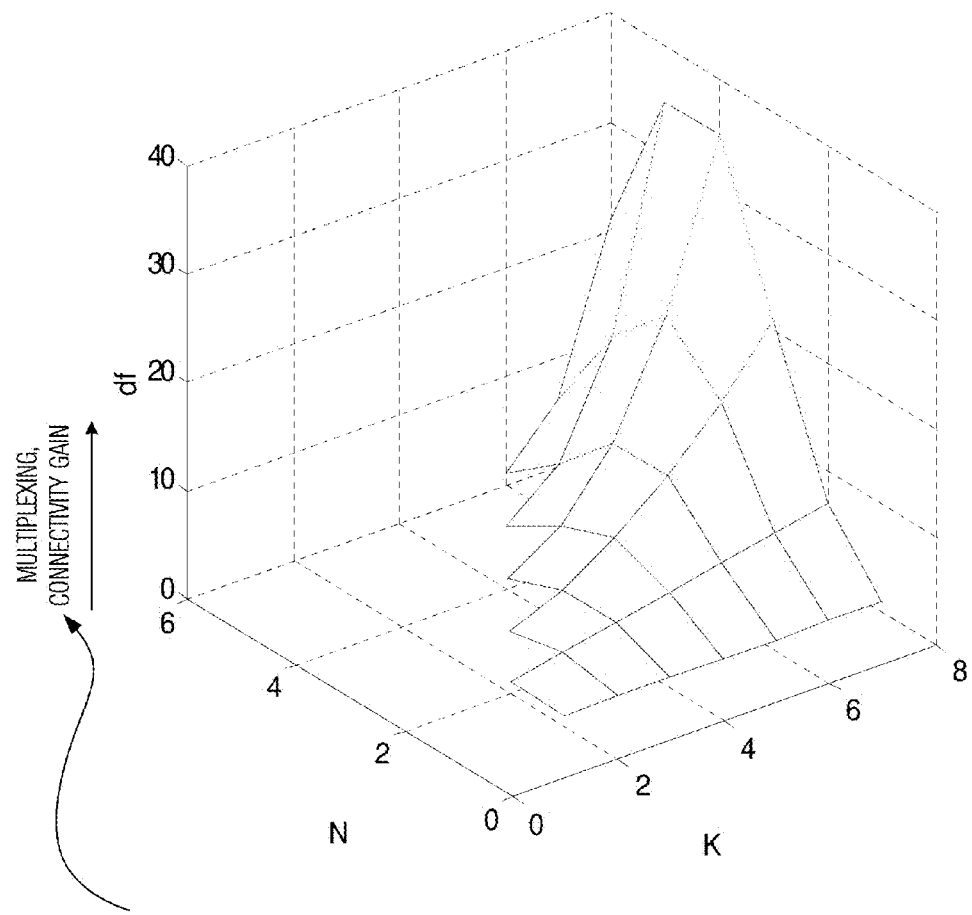

FIGS. 3*a* and 3*b* illustrate example plots of SCMA complexity, multiplexing, spectral efficiency, and link-budget trade-off. As shown in FIG. 3*b*, for a given N and K, complexity can be capped by limiting the number of multiplexed layers. The cost for doing so may be a lower overloading factor, as discussed below.

Figure 4A:
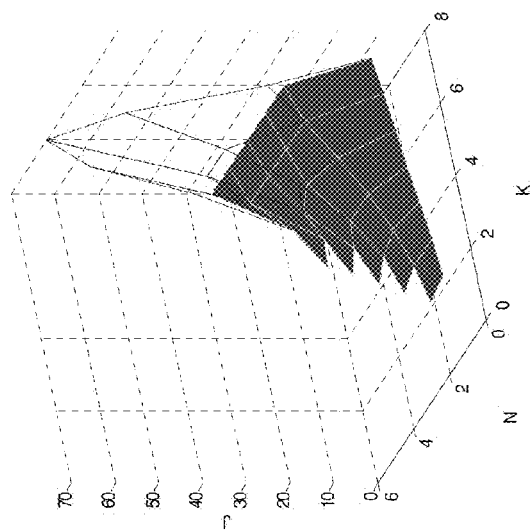
FIGS. 4a, 4b, and 4c illustrate example plots of SCMA system parameters highlighting complexity, multiplexing, spectral efficiency, and link-budget trade-off if overloading is capped to control complexity according to example embodiments described herein.
Figure 4B:
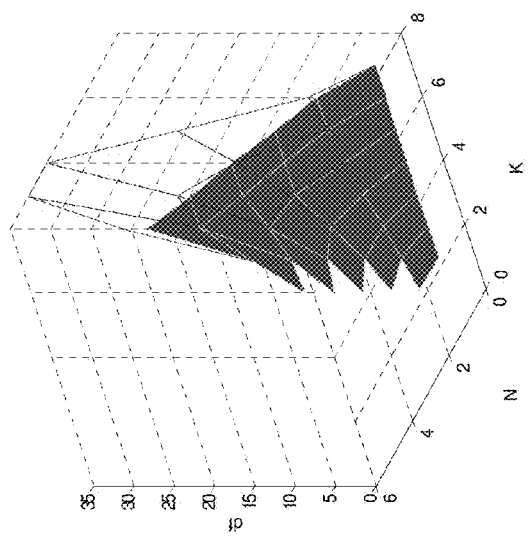
Figure 4C:
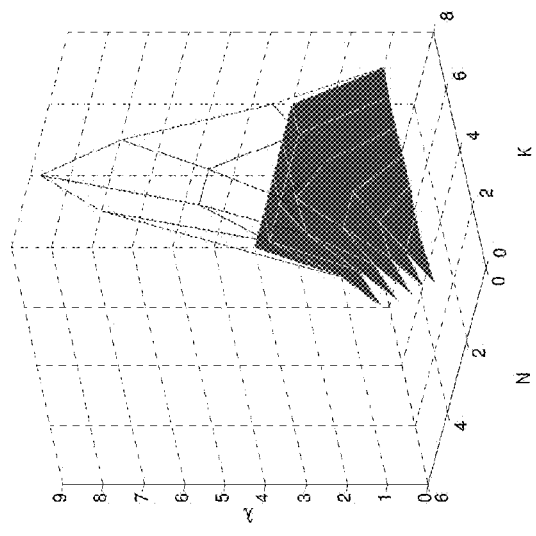

FIGS. 4a, 4b, and 4c illustrate example plots of SCMA if overloading is capped to control complexity. As an example, complexity may be limited by reducing the number of overlaid codewords.

According to an example embodiment, a SCMA communications system is used to implement flexible and scalable access techniques that compromise amongst criteria, e.g., spectral efficiency, coverage, detection complexity, connectivity, link budget, and the like, to support different application scenarios and access modes under a single communications system with a smooth switching mechanism. The implementation is achieved by selecting an access mode in accordance with access mode criteria, communications system information, and UE information, and the selected access mode is implemented by setting SCMA parameters based on mapping rules and the selected access mode.

According to an example embodiment, a SCMA communications system optimizes access modes for different application scenarios and different receive categories. The optimization of the access modes is achieved by adjusting SCMA parameters. As an example, an access mode adaptation mechanism, having predefined access modes for both UL and DL, selects a best access mode in accordance with access mode criteria, such as applications, requirements, network conditions, and the like. Additionally, signaling support is provided to switch between different access modes. The SCMA communications system is adaptively adjusted according to access mode criteria. There is low signaling overhead to switch the access mode and/or parameters in response to the access mode criteria.

In general, SCMA-OFDM is a flexible waveform that can facilitate different access modes, including existing ones such as OFDMA, LDS-OFDM, UL MU-MIMO, and MC-CDMA. SCMA-OFDM also is a promising waveform/access technology for proposed 5G standards and beyond. The access modes may be applied to an individual transmission, a plurality of transmissions, a single communications channel (uplink, downlink, or uplink and downlink), or a plurality of communications channels.

Figure 5:
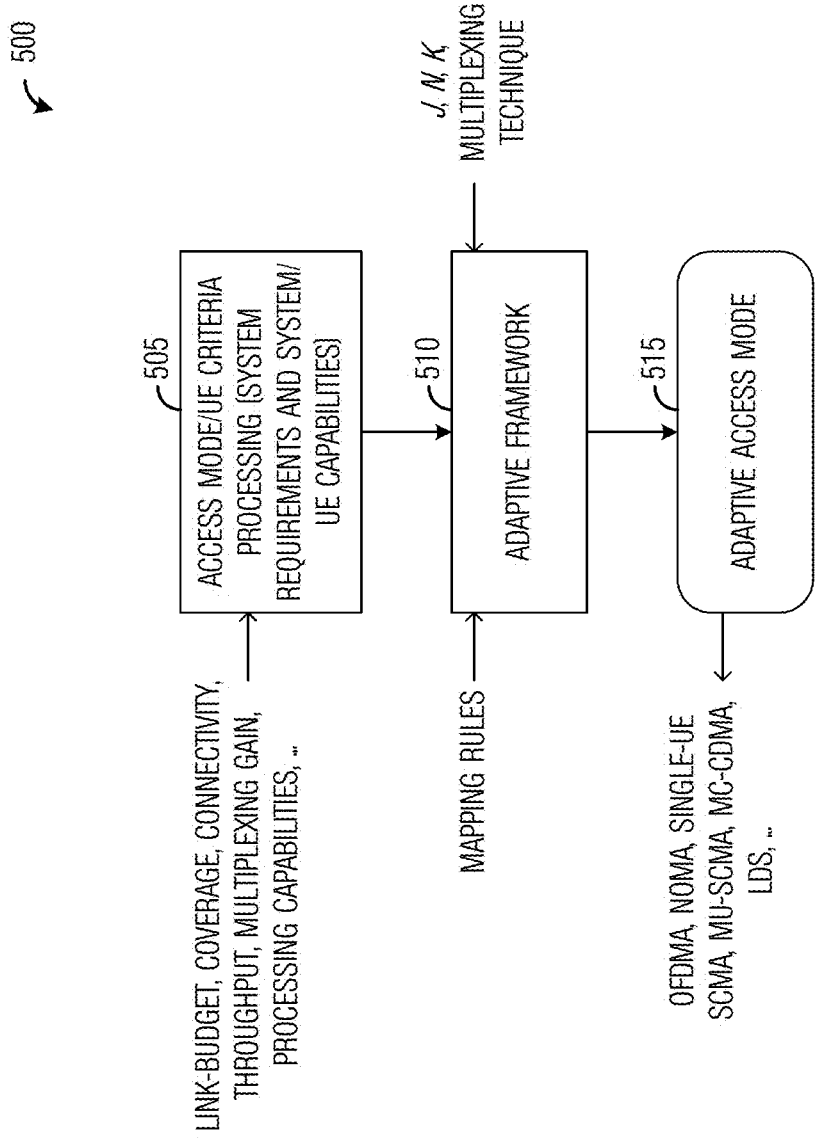
FIG. 5 illustrates an example high-level view of an example adapting device according to example embodiments described herein.

FIG. 5 illustrates a high-level view of an example adapting device 500. Adapting device 500 may perform access mode/UE criteria processing 505 on access mode criteria, which may include communications system requirements, and communications system capabilities, as well as UE criteria, which may include UE capabilities and UE requirements. The processed access mode criteria and/or the UE criteria may be provided to an adaptive framework 510 to select an access mode 515. Examples of access mode criteria and/or UE criteria may include link-budget, coverage, connectivity, throughput, multiplexing gain, processing capabilities, and the like. Adaptive framework 510 may utilize mapping rules to select values for communications system parameters (such as J, N, K, $d_f$, $\lambda$, multiplexing technique, and the like) to emulate an access mode to meet the access mode criteria and/or the UE criteria. Examples of access modes include OFDMA, NOMA, single UE SCMA (SU-SCMA), multi-user SCMA (MU-SCMA), multi-carrier CDMA (MC-CDMA), low density signature (LDS), and the like.

Table 1 below illustrates example predefined downlink (DL) multiple access modes, in which J is a maximum number of signatures/codebooks, K is a spreading factor, and $N \leq K$ is a number of non-zero elements in each signature/codeword.

TABLE 1

Example downlink multiple access modes.

| Scenario | J | K | N | Codebook/Signature | Comment | Typical Applications |
|---|---|---|---|---|---|---|
| SCMA-mode1 | $J \leq f(N, K)$ | K > N | N >> 1 | SCMA multidimensional cocebooks, or LDS signatures | large processing gain due to large effective spreading factor | Link budget and coverage improvement |
| SCMA-Mode2 | Moderate | K > N | N > 1 | SCMA multidimensional codebooks, or LDS signatures | User pairing with power allocation, Low to moderate overloading factor | Capacity enhancement or interference whitening |
| SCMA-Mode3 | Large | K > N | N > 1 | SCMA multidimensional codebooks, or LDS signatures | Large overloading factor | Scheduling free small packet transmission for massive connectivity |
| OFDMA | 1 | 1 | 1 | — | Non-superposition type transmission | legacy UEs or UE with no SCMA decoding capability might fall into this category |
| DL-NOMA | J > 1 (reuse) | 1 | 1 | — | User superposition with power sharing | DL user paring and open loop multiple access for UEs with SIC reception capability |
| MC-CDMA | $J \leq K$ | K = N | N > 1 | Orthogonal or non-orthogonal CDMA signatures | CDMA signatures allocated to one or multiple UEs | Coverage/link budget improvement with under-loading |

Table 2 below illustrates predefined uplink (UL) multiple access modes in which J is a maximum number of signatures/codebooks, K is a spreading factor, and N≤K is a number of non-zero elements in each signature/codeword.

TABLE 2

Example uplink multiple access modes.

| Scenario | J | K | N | Codebook/Signature | Comment | Typical Applications |
|---|---|---|---|---|---|---|
| SCMA-Mode1 | J ≤ f (N, K) | K > N | N >> 1 | SCMA multidimensional codebooks, or LDS signatures | large processing gain due to large effective spreading factor | Link budget and coverage improvement |
| SCMA-Mode-2 | Moderate | K > N | N > 1 | SCMA multidimensional codebooks, or LDS signatures | Moderate overloading factor | Interference whitening and multi-user channel diversity for better capacity |
| SCMA-Mode-3 | Large | K > N | N > 1 | SCMA multidimensional codebooks, or LDS signatures | Large overloading factor | Contention based small packet transmission for massive connectivity |
| OFDMA, SC-FDMA | 1 | 1 | 1 | — | Non-superposition type transmission | Legacy UEs and BSs with no SCMA decoding capabilities might fall into this category. |
| UL-NOMA | J > 1 (reuse) | 1 | 1 | — | Superposition type transmission | UL multi-user access with non-linear reception capability (SIC) at BS |
| MC-CDMA | J ≤ K | K = N | N > 1 | Orthogonal or non-orthogonal CDMA signatures | CDMA signatures allocated to one or multiple UEs | For coverage/link budget improvement to get processing gain |

Figure 6A:
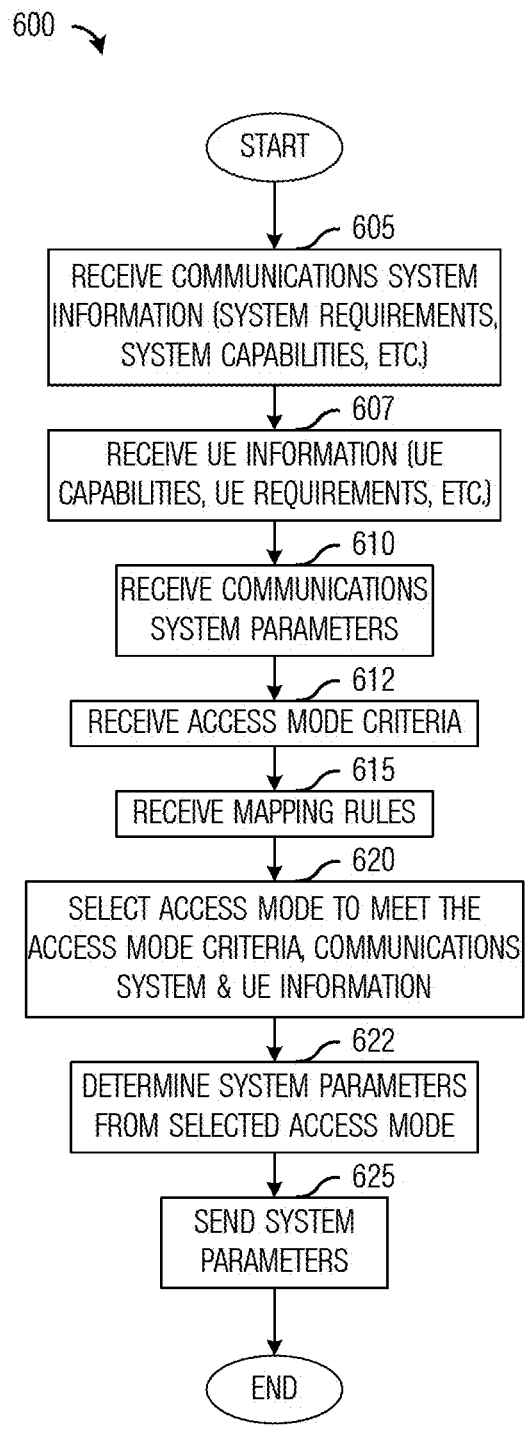
FIG. 6a illustrates an example flow diagram of example operations occurring in an adapting device as the adapting device adaptively adjusts an access mode of a communications system (or a part thereof) according to example embodiments described herein.

FIG. 6a illustrates a flow diagram of example operations 600 occurring in an adapting device as the adapting device adaptively adjusts an access mode of a communications system (or a part thereof). Operations 600 may be indicative of operations occurring in an adapting device, such as a stand-alone adapting device or a co-located adapting device located in a network device, such as an eNB, in the communications system, as the adapting device adaptively adjusts the access mode of the communications system (or a part thereof).

Operations 600 may begin with the adapting device receiving communications system information (block 605). As discussed previously, the communications system information may include information about applications, requirements, network conditions, and the like. Examples of the communications system information may include communications system requirements, and/or communications system capabilities, and the like. The adapting device may receive the communications system information from controller(s) or eNB(s) in the communications system, or another network entity in the communications system that maintains the access mode criteria.

The adapting device may receive UE information (block 607). Examples of UE information may include UE capabilities, UE requirements, and the like. The adapting device may receive the UE information from UE(s) that it is serving, UE(s) in the communications system, a network entity in the communications system that maintains the UE criteria.

The adapting device may receive communications system parameters (block 610). The communications system parameters may include J, N, K, $d_f$, λ, multiplexing technique, and the like. The adapting device may have a default version of the communications system parameters provided to it at system start up, for example, and then as it (as well as potentially other adapting devices) adjusts the communications system parameters, the adapting device may receive (or provide) updates for the communications system parameters. Depending on a granularity of the adaptation (e.g., communications system wide, eNB wide, cell wide, eNB-to-UE type wide, eNB-to-UE pairing wide), the adapting device may store different versions of the communications system parameters for the different levels of granularity and devices involved.

The adapting device may receive access mode criteria (block 612). The access mode criteria may include link-budget, coverage, connectivity, throughput, multiplexing gain, processing capabilities, and the like. According to an example embodiment, the access mode criteria may be associated with a transmission(s) or a communications channel. The access mode criteria may be associated with a single transmission over a single communications channel, a plurality of transmissions over a single communications channel, a plurality of transmissions over a plurality of communications channels, a single communications channel (such as a downlink communications channel between an eNB and a UE or an uplink communications channel between a UE and an eNB), or a plurality of communications channels (such as both downlink and uplink communications channels between an eNB and a UE, uplink and/or downlink communications channels between an eNB and a type (or group) of UEs, uplink and/or downlink communications channels between a group of eNBs and a type (or group) of UEs, uplink and/or downlink communications channels between all eNBs and a type (or group) of UEs, uplink and/or downlink communications channels between all eNBs and all UEs, and the like).

The adapting device may receive mapping rules (block 615). The mapping rules may specify how the communications system parameter(s), e.g., SCMA parameter(s), are affected by the access mode criteria, the communications system information, and the UE information. The mapping rules may be associated with transmissions for downlink communications channels, uplink communications channels, or both downlink and uplink communications channels. The mapping rules may differ for different types or groups of UEs. The mapping rules may differ for one eNB or multiple eNBs. The mapping rules may also specify how to change the communications system parameter(s) and potentially, by how much. As an illustrative example, parameter K may be impacted by UE that have no SCMA capability, while parameters K and J may be impacted by a need to support large number of overlaid transmissions in a massive connectivity situation. Table 3 below illustrates example mapping rules.

TABLE 3

Example mapping rules.

| No. | Requirements/Capabilities | Acceptable access mode | System parameters |
|---|---|---|---|
| 1 | Legacy users with no capabilities to handle spreading in any forms as well as no SIC reception capability | OFDMA transmission mode | K = 1 and no super positioning |
| 2 | Legacy users with no capability to handle spreading in any forms but with SIC reception capability | OFDMA transmission mode and user pairing (NOMA) | K = 1 and UE pairing |
| 3 | User can support spreading with linear reception techniques | MC-CDMA | K > 1 but no overloading |
| 4 | This MC-CDMA user needs larger coverage and link budget | | Increase K with limited J |
| 5 | More MC-CDMA users need to access the system to support massive connectivity for example for contention-based transmission | | Increase K and J considering complexity capability of receivers |
| 6 | User can support SCMA spreading with advanced non-linear reception capabilities | SCMA-OFDM | SCMA codebooks with appropriate K, J, and $d_f$ |
| 7 | This SCMA user needs larger coverage and link budget | | Increase N only or both N and K while limit J and consider complexity impacts. Increasing N improves processing and multi-dimensional gain of SCMA codebooks. |
| 8 | More SCMA users need to access the system to support massive connectivity for example for contention-based access | | Increase K and J considering complexity capability of receivers by controlling N. |
| 9 | Throughput improvement for SCMA users | | SCMA codebooks rather than LDS signatures Increase N at the expense of more complexity Allow UE pairing if users and network support UE pairing access mode (MU-SCMA) |
| 10 | SCMA users with low PAPR requirements for example for small packet transmission of UL access or MTC | | Limit bandwidth of transmission Use SCMA codebooks providing lower PAPR at the expense of possible less throughput performance Reduce N to decrease PAPR with careful codebook design |

The adapting device may select an access mode in accordance with the mapping rules to meet the access mode criteria, the communications system information, and the UE information (block 620). The adapting device may select the access mode out of a plurality of access modes. As an illustrative example, the adapting device may have a list of the plurality of access modes and the adapting device may select the access mode out of the plurality of access modes. The adapting device may select the access mode from the plurality of access modes by considering the access mode criteria, the communications system information, and the UE information. As an illustrative example, if the UE is a legacy UE with no SCMA capability, the adapting device may select OFDMA as the access mode. Similarly, if the UE is SCMA capable, the adapting device may consider access mode criteria, such as link-budget, coverage, and the like, to select the access mode. Detailed discussions of example access mode selection techniques are presented below.

The adapting device may determine the communications system parameters, e.g., SCMA parameters, from the selected access mode in accordance with the mapping rules (block 622). The adapting device may use mapping rules, such as the example mapping rules shown in Table 3, to determine values for communications system parameters from the selected access mode. As an illustrative example, if the selected access mode for a specified type of UE is to increase the coverage area for the UE, the adapting device may use mapping rule #7 shown in Table 3 and increase parameter N only or both parameters N and K while limiting parameter J and consider complexity impacts, since increasing parameter N improves processing and multi-dimensional gain of SCMA codebooks.

The adapting device may signal the communications system parameters (block 625). The adapting device may send the communications system parameters to devices impacted by the access mode change. As an illustrative example, if the access mode change is for the communications system as a whole, the adapting device may send the communications system parameters to the eNBs in the communications system, which may provide the communications system parameters to the UEs that they serve. As another illustrative example, if the access mode change is for an eNB, the adapting device may send the communications system parameters to the eNB and the eNB may provide the communications system parameters to the UE that it serves. As yet another illustrative example, if the access mode change is for a single cell and UE type, the adapting device may send the communications system parameters to an eNB associated with the cell and the eNB may provide the communications system parameters to the UEs that it is serving that are of same UE type. As yet another illustrative example, if the access mode change is for a single cell and a single UE, the adapting device may send the communications system parameters to an eNB associated with the cell and the eNB may provide the communications system parameters to the UE. According to an example embodiment, there may be a pre-defined plurality of access modes and the adapting device may simply send an indicator, e.g., a number that corresponds to the selected access mode.

Figure 6B:
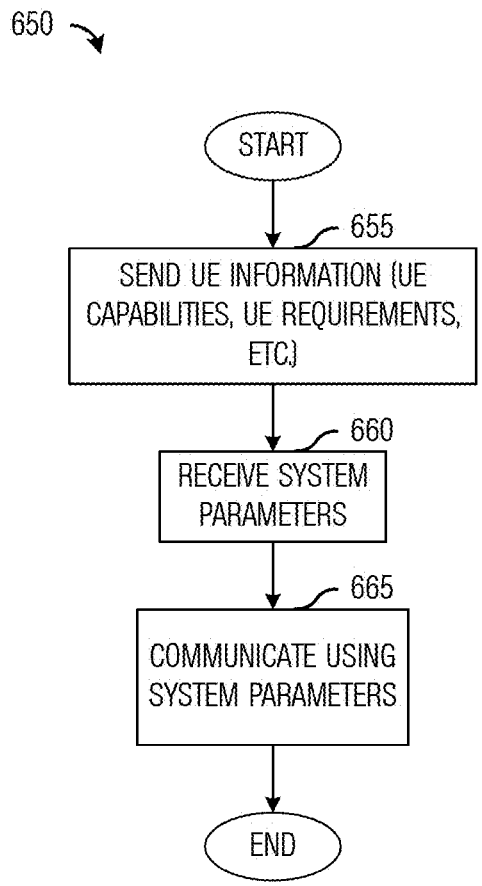
FIG. 6b illustrates an example flow diagram of example operations occurring in a UE as the UE communicates according to example embodiments described herein.

FIG. 6b illustrates an example flow diagram of example operations 650 occurring in a UE as the UE communicates. Operations 650 may be indicative of operations occurring in a UE, such as UE 110, UE 112, and UE 114, as the UE communicates.

Operations 650 may begin with the UE sending UE information (block 655). The UE may send the UE information, including UE capabilities and/or requirements, and the like. The UE information may be sent to an eNB serving the UE or an adapting device that is performing access mode selection. The UE may receive communications system parameters (block 660). The UE may receive the communications system parameters from the eNB or the adapting device, whichever is performing access mode selection. The communications system parameters may be sent to the UE as well as other devices that are impacted by the access mode selection. According to an example embodiment, there may be a pre-defined plurality of access modes and the UE may receive an indicator, e.g., a number that corresponds to the selected access mode. The UE may communicate using the communications system parameters (block 665).

Figure 7:
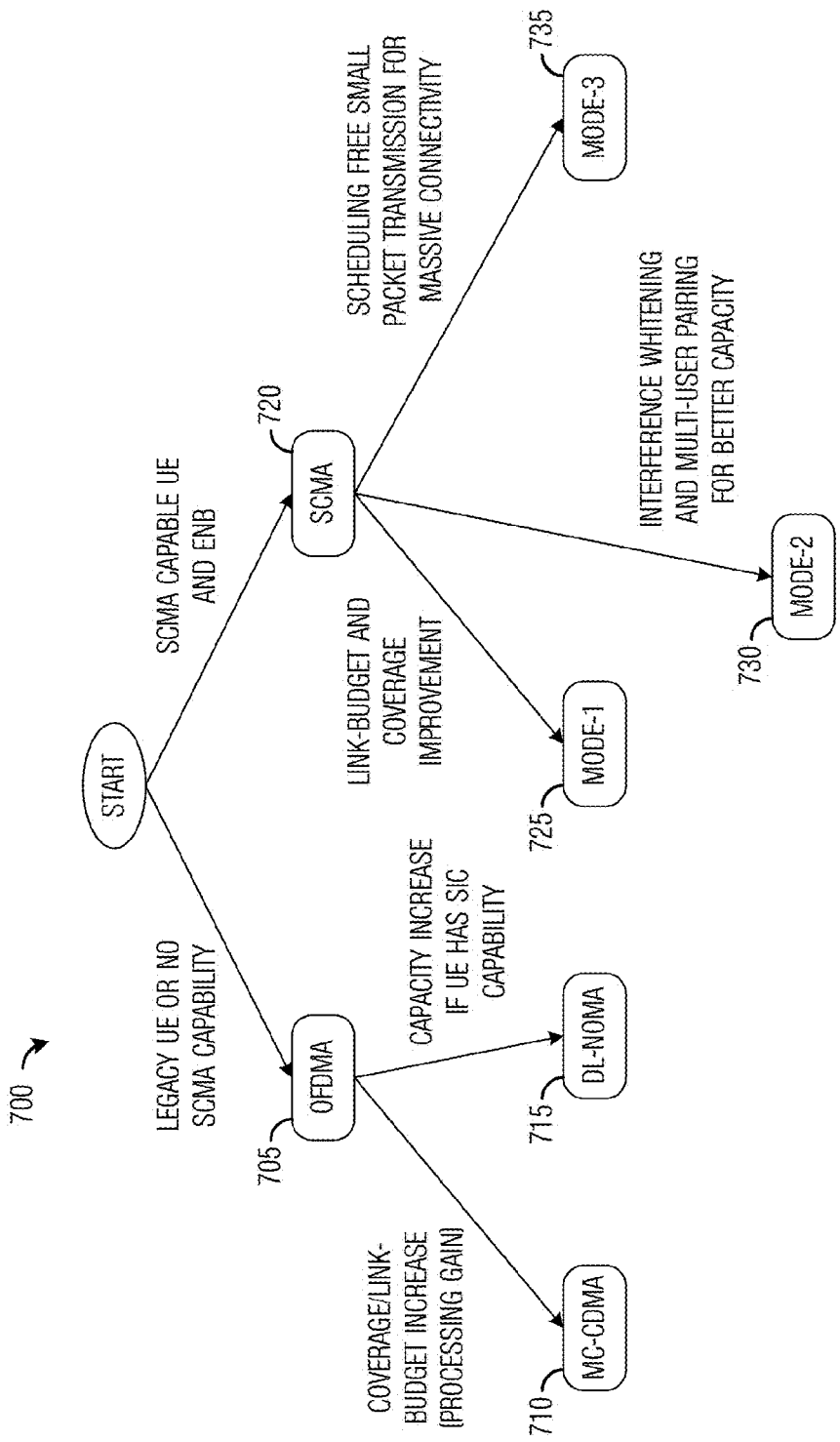
FIG. 7 illustrates an example graphical mapping rule for downlink access mode selection according to example embodiments described herein.

FIG. 7 illustrates an example graphical representation of a mapping rule 700 for downlink access mode selection. The representation of mapping rule 700 shown in FIG. 7 may illustrate graphically the selection of an access mode for a downlink. The adapting device may select OFDMA 705 for the downlink if the UE(s) are legacy UEs or if SCMA is not supported. Then, if coverage and/or link budget increase is an access mode criterion, the adapting device may select MC-CDMA 710. If capacity increase is access mode criterion and the UE(s) has successive interference cancellation capability, the adapting device may select DL-NOMA 715.

The adapting device may select SCMA 720 if the UE(s) and eNB(s) are SCMA capable. Then if link-budget and coverage improvement are access mode criterion, the adapting device may select mode-1 SCMA 725. If interference whitening and multi-user pairing for better capacity are access mode criterion, the adapting device may select mode-2 SCMA 730, and if scheduling free small packet transmission for massive connectivity is the access mode criteria, the adapting device may select mode-3 SCMA 735.

Figure 8:
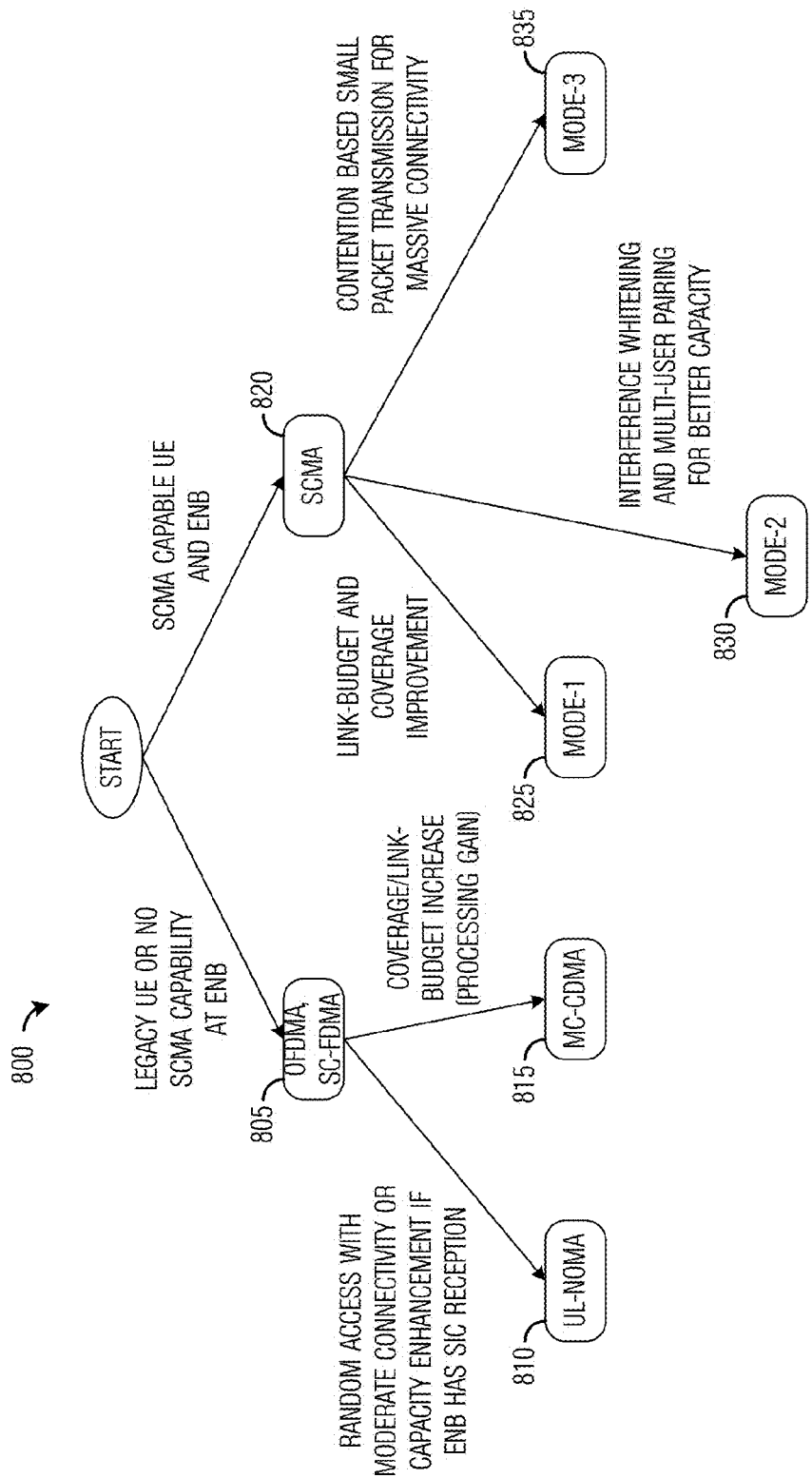
FIG. 8 illustrates an example graphical mapping rule for uplink access mode selection according to example embodiments described herein.

FIG. 8 illustrates an example graphical representation of a mapping rule 800 for uplink access mode selection. The representation of mapping rule 800 shown in FIG. 8 may illustrate graphically the selection of an access mode for an uplink. The adapting device may select OFDMA or SC-FDMA 805 for the uplink if the UE(s) are legacy UEs and if SCMA is not supported at the eNB(s). Then, if random access with moderate connectivity or capacity enhancement if eNB has SIC reception, the adapting device may select UL-NOMA 810. If coverage and/or link budget increase are access mode criterion, the adapting device may select MC-CDMA 815.

The adapting device may select SCMA 820 if the UE(s) and eNB(s) are SCMA capable. Then, if link-budget and coverage improvement are access mode criterion, the adapting device may select mode-1 SCMA 825. If interference whitening and multi-user pairing for better capacity are access mode criterion, the adapting device may select mode-2 SCMA 830, and if scheduling free small packet transmission for massive connectivity is the access mode criteria, the adapting device may select mode-3 SCMA 835.

Figure 9:
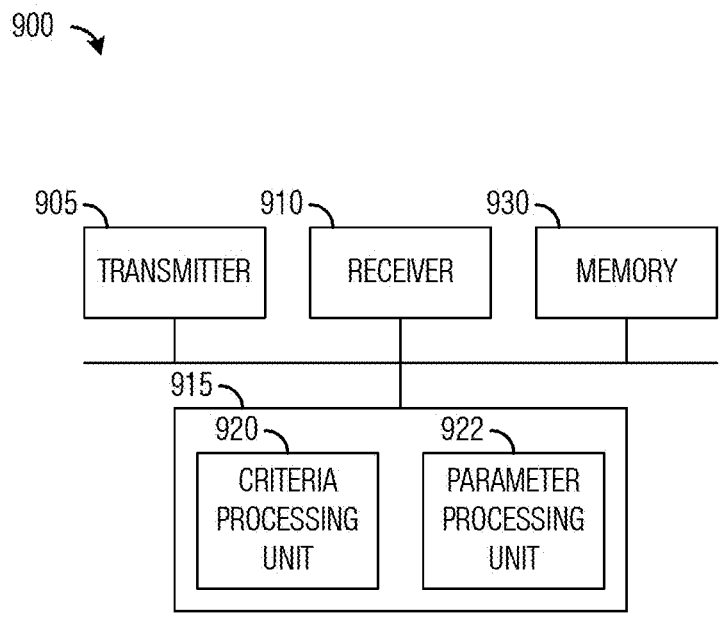
FIG. 9 illustrates an example communications device according to example embodiments described herein.

FIG. 9 illustrates an example first communications device 900. Communications device 900 may be an implementation of an adapting device, such as a stand-alone device, or a co-located device located in an eNB, a communications controller, a base station, a controller, and the like. Communications device 900 may be used to implement various ones of the embodiments discussed herein. As shown in FIG. 9, a transmitter 905 is configured to transmit packets, communications system parameters, and the like. Communications device 900 also includes a receiver 910 that is configured to receive packets, access mode criteria, communications system parameters, mapping rules, and the like.

A criteria processing unit 920 is configured to process access mode criteria and communications system information, such as communications system requirements, communications system capabilities link-budget, coverage, connectivity, throughput, multiplexing gain, and the like, to help adapt an access mode. Criteria processing unit 920 is configured to process UE information to help adapt the access mode. A parameter processing unit 922 is configured to receive processed access mode criteria, communications system information, UE information, and communications system parameters, and to select an access mode in accordance with the access mode criteria, the communications system information, and the UE information. Parameter processing unit 922 is configured to set the communications system parameters in accordance with the mapping rules and the selected access mode. A memory 930 is configured to store packets, access mode criteria, communications system information, UE information, communications system parameters, mapping rules, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while criteria processing unit 920 and parameter processing unit 922 may be software modules executing in a microprocessor (such as processor 915) or a custom circuit or a custom compiled logic array of a field programmable logic array. Criteria processing unit 920 and parameter processing unit 922 may be modules stored in memory 930.

Figure 10:
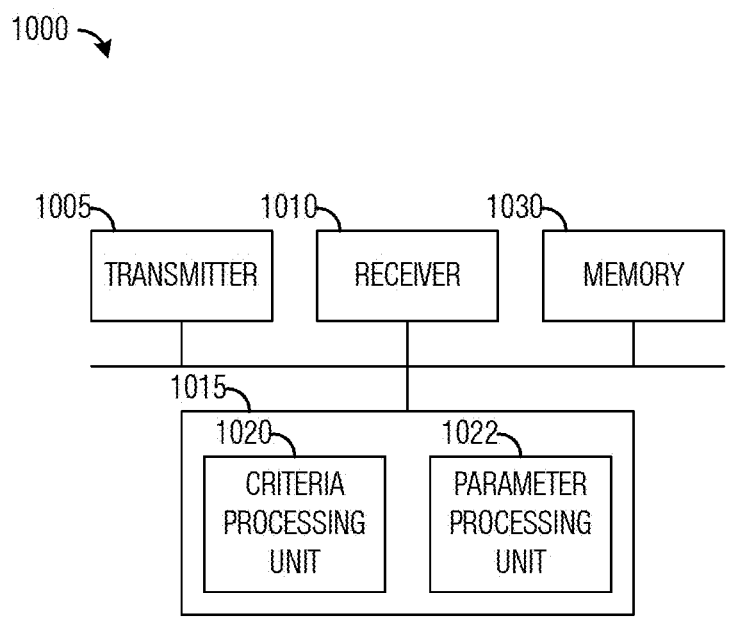
FIG. 10 illustrates an example communications device according to example embodiments described herein.

FIG. 10 illustrates an example second communications device 1000. Communications device 1000 may be an implementation of a receiving device, such as a user equipment, an eNB, and the like. Communications device 1000 may be used to implement various ones of the embodiments discussed herein. As shown in FIG. 10, a transmitter 1005 is configured to transmit packets, access mode criteria, mapping rules, and the like. Communications device 1000 also includes a receiver 1010 that is configured to receive packets, communications system parameters, and the like.

A criteria processing unit 1020 is configured to process access mode criteria and communications system information, such as communications system requirements, communications system capabilities link-budget, coverage, connectivity, throughput, multiplexing gain, and the like, and UE information, such as UE capabilities, UE requirements, and the like, to help adapt an access mode. A parameter processing unit 1022 is configured to receive information, such as communications system parameters, associated with an access mode. A memory 1030 is configured to store packets, access mode criteria, communications system information, UE information, communications system parameters, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while criteria processing unit 1020 and parameter processing unit 1022 may be software modules executing in a microprocessor (such as processor 1015) or a custom circuit or a custom compiled logic array of a field programmable logic array. Criteria processing unit 1020 and parameter processing unit 1022 may be modules stored in memory 1030.

Although the present disclosure and its advantages have been described in detail, it should be understood that various changes, substitutions and alterations can be made herein without departing from the spirit and scope of the disclosure as defined by the appended claims.

What is claimed is:

1. A method for operating an adapting device, the method comprising:
   selecting, by the adapting device, a first access mode out of a plurality of access modes for a first transmission between a first communications device and a second communications device, wherein the selection of the first access mode is made in accordance with an access mode criterion, and at least one of communications system information, and user equipment information;
   determining, by the adapting device, sparse code multiple access (SCMA) parameters from the first access mode in accordance with a SCMA parameter mapping rule; and
   providing, by the adapting device, information about the first access mode to at least one of the first communications device and the second communications device.

2. The method of claim 1, wherein the communications system information comprises at least one of communications system capabilities and communications system requirements.

3. The method of claim 1, wherein the user equipment information comprises at least one of user equipment capabilities and user equipment requirements.

4. The method of claim 1, wherein the SCMA parameters comprise at least one of M, K, J, N, l, $\lambda$, and $d_f$, where M is a number of codewords in a SCMA codebook, K is a spreading factor, J is a maximum number of layers, N is a number of nonzero elements in each codeword of a SCMA codebook, l is a number of overlapping elements of any two distinct codebooks, $\lambda$ is an overloading factor, and $d_f$ is maximum number of codewords colliding at a tone.

5. The method of claim 1, wherein the SCMA parameters mapping rule defines a relationship between the first access mode and values of the SCMA parameters.

6. The method of claim 1, wherein the SCMA parameters mapping rule is predefined and stored in the adapting device.

7. The method of claim 1, wherein the access mode criterion comprises at least one of communications system spectral efficiency, communications system coverage, communications system detection complexity, communications system connectivity, and communications system link budget.

8. The method of claim 1, wherein the first transmission comprises one of an uplink transmission and a downlink transmission.

9. The method of claim 1, wherein the first transmission comprises an uplink transmission and a downlink transmission, and wherein selecting the first access mode comprises:
   selecting a second access mode for the uplink transmission; and
   selecting a third access mode for the downlink transmission.

10. The method of claim 1, further comprising selecting the first access mode in accordance with a fourth access mode associated with a second transmission sharing at least one network resource with the first transmission, wherein the first access mode is selected so that the first access mode does not conflict with the fourth access mode.

11. The method of claim 1, wherein providing the information about the first access mode comprises transmitting an indicator of the first access mode.

12. The method of claim 11, wherein the indicator is transmitted using one of semi-static messaging and dynamic messaging.

13. A method for operating a first device, the method comprising:
   sending, by the first device, user equipment information to a second device, wherein the user equipment information comprises at least one of user equipment requirements and user equipment capability;
   receiving, by the first device, information about sparse code multiple access (SCMA) parameters related to an access mode for a transmission between the first device and a third device, wherein the access mode is selected out of a plurality of access modes in accordance with an access mode criterion, and at least one of the user equipment information and communications system information; and communicating, by the first device, with the third device in accordance with the access mode.

14. The method of claim 13, wherein the SCMA parameters are related to the access mode by a SCMA parameters mapping rule.

15. The method of claim 13, wherein the first device comprises a user equipment.

16. The method of claim 13, wherein the second device comprises an evolved NodeB and the third device comprises the evolved NodeB.

17. The method of claim 13, wherein the second device comprises an adapting device and the third device comprises an evolved NodeB.

18. An adapting device comprising:
a processor configured to select a first access mode out of a plurality of access modes for a first transmission between a first communications device and a second communications device, wherein the selection of the first access mode is made in accordance with an access mode criterion, and at least one of communications system information, and user equipment information, to determine sparse code multiple access (SCMA) parameters from the first access mode in accordance with a SCMA parameter mapping rule, and to provide information about the first access mode to at least one of the first communications device and the second communications device.

19. The adapting device of claim 18, further comprising a receiver operatively coupled to the processor, the receiver configured to receive the user equipment information.

20. The adapting device of claim 18, wherein the SCMA parameters comprise at least one of M, K, J, N, l, $\lambda$, and $d_f$, where M is a number of codewords in a SCMA codebook, K is a spreading factor, J is a maximum number of layers, N is a number of nonzero elements in each codeword of a SCMA codebook, l is a number of overlapping elements of any two distinct codebooks, $\lambda$, is an overloading factor, and $d_f$ is maximum number of codewords colliding at a tone.

21. The adapting device of claim 18, further comprising a transmitter operatively coupled to the processor, the transmitter configured to transmit an indicator of the first access mode.

22. The adapting device of claim 18, wherein the first transmission comprises an uplink transmission and a downlink transmission, and wherein the processor is configured to select a second access mode for the uplink transmission, and to select a third access mode for the downlink transmission.

23. The adapting device of claim 18, wherein the processor is configured to select the first access mode in accordance with a fourth access mode associated with a second transmission sharing at least one network resource with the first transmission, wherein the first access mode is selected so that the first access mode does not conflict with the fourth access mode.

24. A user equipment comprising:
a transmitter configured to send user equipment information to a first communications device, wherein the user equipment information comprises at least one of user equipment requirements and user equipment capability;
a receiver configured to receive information about sparse code multiple access (SCMA) parameters related to an access mode for a transmission between the user equipment and a second communications device, wherein the access mode is selected out of a plurality of access modes in accordance with an access mode criterion, and at least one of the user equipment information and communications system information; and
a processor operatively coupled to the transmitter and to the receiver, the processor configured to communicate with the second communications device in accordance with the access mode.

25. The user equipment of claim 24, wherein the SCMA parameters are related to the access mode by a SCMA parameters mapping rule.

26. The user equipment of claim 24, wherein the first communications device comprises an evolved NodeB and the second communications device comprises the evolved NodeB.

27. The user equipment of claim 24, wherein the first communications device comprises an adapting device and the second communications device comprises an evolved NodeB.

* * * * *